(12) United States Patent
Slanina

(10) Patent No.: US 9,492,854 B2
(45) Date of Patent: Nov. 15, 2016

(54) FOOD WASTE MANAGEMENT SYSTEM

(75) Inventor: James Slanina, Chicago, IL (US)

(73) Assignee: ENVIROPURE SYSTEMS, LLC, Chicago, IL (US)

( * ) Notice: Subject to any disclaimer, the term of this patent is extended or adjusted under 35 U.S.C. 154(b) by 882 days.

(21) Appl. No.: 13/438,931

(22) Filed: Apr. 4, 2012

(65) Prior Publication Data

US 2012/0261320 A1 Oct. 18, 2012

Related U.S. Application Data

(60) Provisional application No. 61/476,059, filed on Apr. 15, 2011.

(51) Int. Cl.
*B09B 5/00* (2006.01)
*C05F 17/00* (2006.01)
*C05F 17/02* (2006.01)

(52) U.S. Cl.
CPC .......... *B09B 5/00* (2013.01); *C05F 17/0018* (2013.01); *C05F 17/0045* (2013.01); *C05F 17/027* (2013.01); *Y02P 20/145* (2015.11); *Y02W 30/43* (2015.05)

(58) Field of Classification Search
None
See application file for complete search history.

(56) References Cited

U.S. PATENT DOCUMENTS

| | | |
|---|---|---|
| 3,930,799 A | 1/1976 | Eweson |
| 4,100,023 A | 7/1978 | McDonald |
| 4,306,969 A | 12/1981 | Tamura et al. |
| 4,632,692 A | 12/1986 | Lebesgue et al. |
| 4,826,601 A | 5/1989 | Spatt |
| 4,852,811 A * | 8/1989 | Adams ............... B02C 23/26 241/1 |
| 5,123,600 A | 6/1992 | Takenaka |
| 5,377,921 A | 1/1995 | Wirth |
| 5,582,793 A | 12/1996 | Glazer et al. |
| 5,593,592 A | 1/1997 | Kagawa et al. |
| 5,716,013 A | 2/1998 | Benson |
| 6,110,727 A | 8/2000 | Widmer et al. |
| 6,110,733 A | 8/2000 | Seymour |
| 6,171,852 B1 | 1/2001 | Bright |
| 6,200,475 B1 | 3/2001 | Chen |
| 6,506,311 B2 | 1/2003 | DeGarmo et al. |
| 6,557,835 B2 | 5/2003 | Dijk |
| 6,783,975 B2 | 8/2004 | Windle |
| 7,015,028 B2 | 3/2006 | Choate et al. |
| 7,078,229 B2 | 7/2006 | Dvorak |
| 7,144,507 B2 | 12/2006 | Baskis |
| 7,160,714 B2 | 1/2007 | Matano |
| 7,176,017 B2 | 2/2007 | Parent et al. |
| 7,294,272 B2 | 11/2007 | Ames et al. |

(Continued)

*Primary Examiner* — Robert James Popovics
(74) *Attorney, Agent, or Firm* — Manelli Selter PLLC; Edward J. Stemberger

(57) ABSTRACT

A food waste management system includes a tank having an internal chamber for containing food waste and sufficient water for fully submersing the food waste. The system further includes a water supply system for supplying water to the internal chamber, a gas supply system for supplying a gas to the internal chamber, a discharge system for discharging water and food waste from the internal chamber, a grinder system for grinding the food waste, the grinder system being disposed in the internal chamber to be fully submersed in the water, a circulation system disposed in the internal chamber for circulating water and food waste and a control system for controlling operation of the food waste management system in accordance with a desired control process. The system further includes a nutrient additive to be supplied to the internal chamber in predetermined amounts at predetermined intervals.

9 Claims, 5 Drawing Sheets

(56) References Cited

U.S. PATENT DOCUMENTS

| | | |
|---|---|---|
| 7,311,834 B2 | 12/2007 | Lee, Jr. |
| 7,316,921 B2 | 1/2008 | Choate et al. |
| 7,604,986 B2 | 10/2009 | Koh |
| 7,727,395 B2 | 6/2010 | Fitch et al. |
| 7,762,713 B2 | 7/2010 | Koh |
| 8,002,979 B2 * | 8/2011 | Bryan-Brown ....... E03C 1/2665 210/173 |
| 2005/0124495 A1 | 6/2005 | Windham et al. |
| 2008/0057164 A1 * | 3/2008 | Roth ....... A23B 4/16 426/281 |
| 2008/0164191 A1 * | 7/2008 | Bryan-Brown ....... E03F 1/002 210/173 |
| 2008/0251451 A1 * | 10/2008 | Christian ....... C02F 3/1221 210/614 |
| 2009/0162923 A1 | 6/2009 | Young et al. |
| 2012/0261320 A1 * | 10/2012 | Slanina ....... B09B 5/00 210/173 |

* cited by examiner

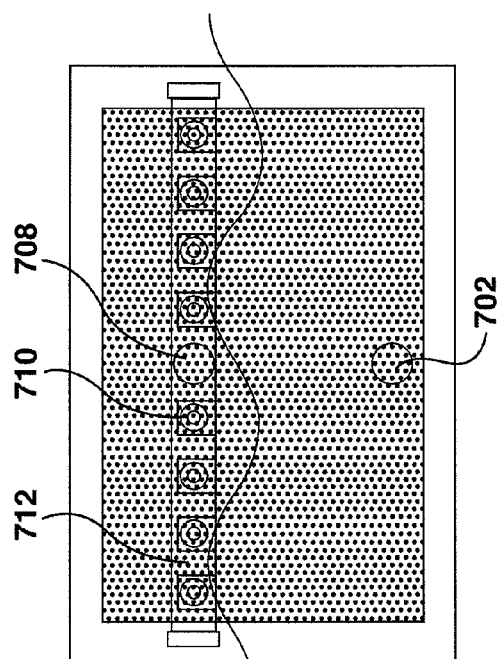
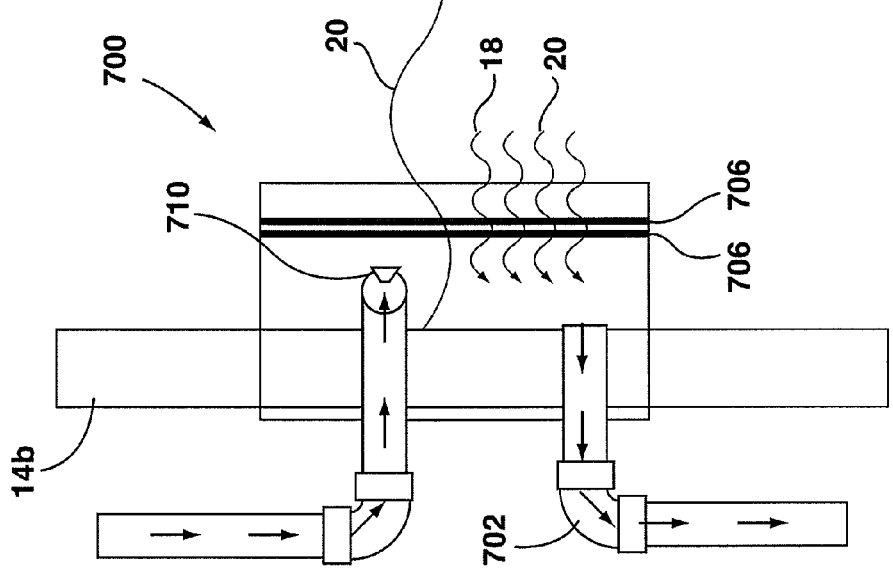
FIG. 3(b)
FIG. 3(a)

FOOD WASTE MANAGEMENT SYSTEM

FIELD

This specification relates to waste management systems and in particular to self contained systems for managing food waste.

BACKGROUND

The following background discussion is not an admission that anything discussed below is citable as prior art or common general knowledge. Any documents listed below are incorporated herein in their entirety by this reference to them.

Food waste creates a wide range of environmental and food safety issues. Decomposing food in dumpsters and landfill emits undesired amounts of methane gas and attracts vermin and other disease spreading pests. Food waste may be collected by waste management vehicles for processing at remote facilities but the use of such vehicles is inefficient and furthers the harm to the environment.

It is desirable that food waste be managed onsite where the food waste is produced, such as supermarkets, restaurants and other commercial or industrial food service locations. Current onsite food waste management systems do not manage the decomposition of the food waste efficiently and do not provide sufficiently reduced levels of BOD, suspended solids and fats, oils and greases. There is a need for an improved system that addresses these and other problems with prior existing systems.

SUMMARY

In one aspect the invention provides a food waste management system including a tank having an internal chamber adapted for containing food waste and sufficient water for fully submersing the food waste; a water supply system adapted for supplying water to the internal chamber; a gas supply system adapted for supplying a desired gas to the internal chamber; a filtration and discharge system adapted for filtering and discharging water and food waste from the internal chamber; a grinder system adapted for grinding the food waste, the grinder system being disposed in the internal chamber and being adapted to be fully submersed in the water; a circulation system disposed in the internal chamber and adapted for circulating water and food waste; and a control system adapted for controlling operation of the food waste disposal management system in accordance with a desired control process.

In another aspect the invention provides a food waste management system including a tank having an internal chamber adapted for containing food waste and sufficient water for fully submersing the food waste; a water supply system adapted for supplying water to the internal chamber; a gas supply system adapted for supplying a desired gas to the internal chamber; a filtration and discharge system adapted for filtering and discharging water and food waste from the internal chamber; a circulation system disposed in the internal chamber and adapted for circulating water and food waste; a nutrient additive adapted to be supplied to the internal chamber at predetermined intervals, the nutrient additive containing nutrients that aid in the decomposition of the food waste; and a control system adapted for controlling operation of the food waste management system in accordance with a desired control process.

In another aspect the invention provides a food waste management system including a tank having an internal chamber adapted for containing food waste and sufficient water for fully submersing the food waste; a water supply system adapted for supplying water to the internal chamber; a gas supply system adapted for supplying a desired gas to the internal chamber; a filtration and discharge system adapted for filtering and discharging water and food waste from the internal chamber; a submersible grinder pump disposed in the internal chamber and adapted for grinding the food waste while being fully submersed in the water; a nutrient additive adapted to be supplied to the internal chamber at predetermined intervals, the nutrient additive containing nutrients that aid in the decomposition of the food waste; and a control system adapted for controlling operation of the food waste management system in accordance with a desired control process.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

FIG. 3(a) is a side view of the filtration and discharge system for the system of FIG. 1;

FIG. 3(b) is a front view of the filtration and discharge system for the system of FIG. 1;

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
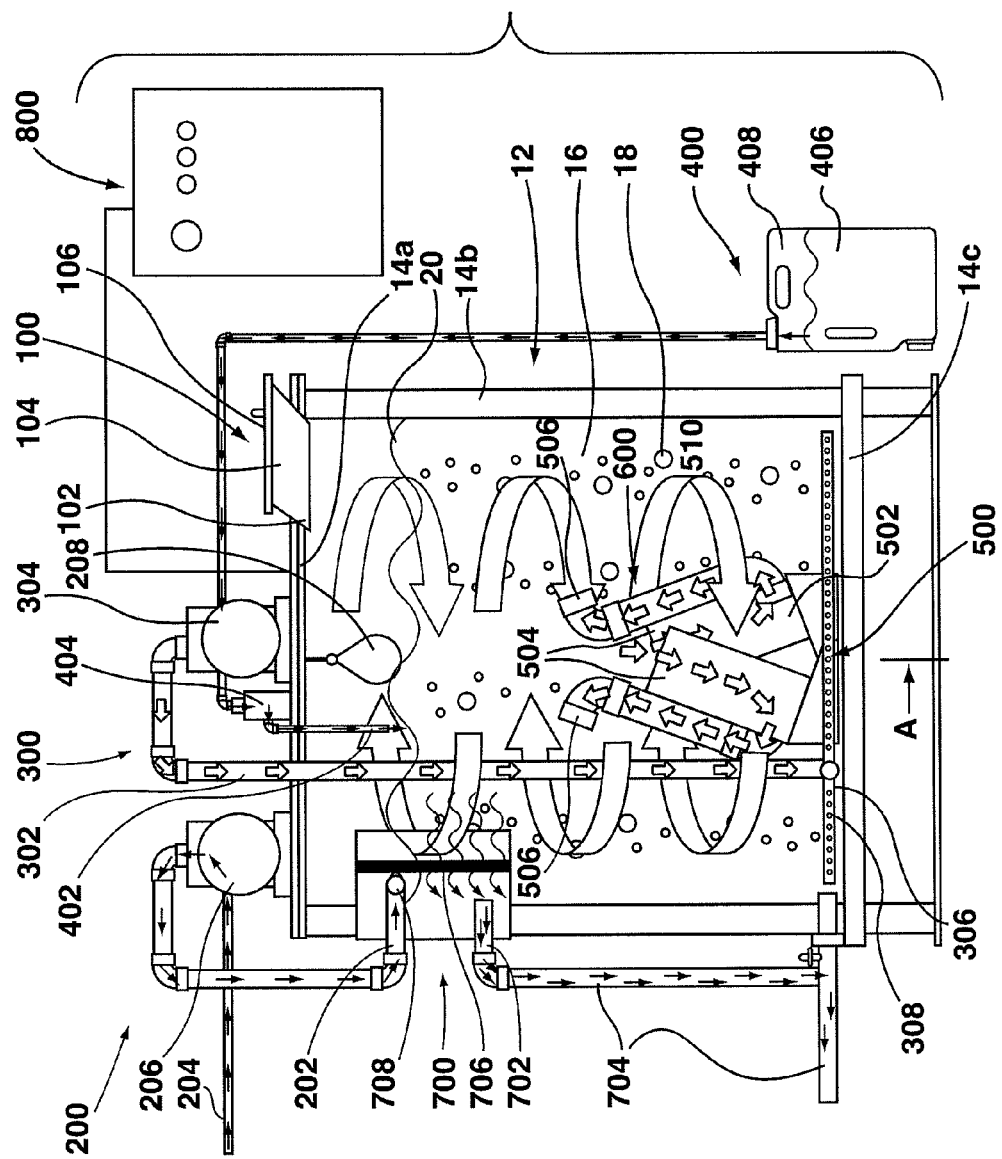
FIG. 1 is a side sectional view of a waste management system in accordance with an embodiment of the present invention.
Figure 2:
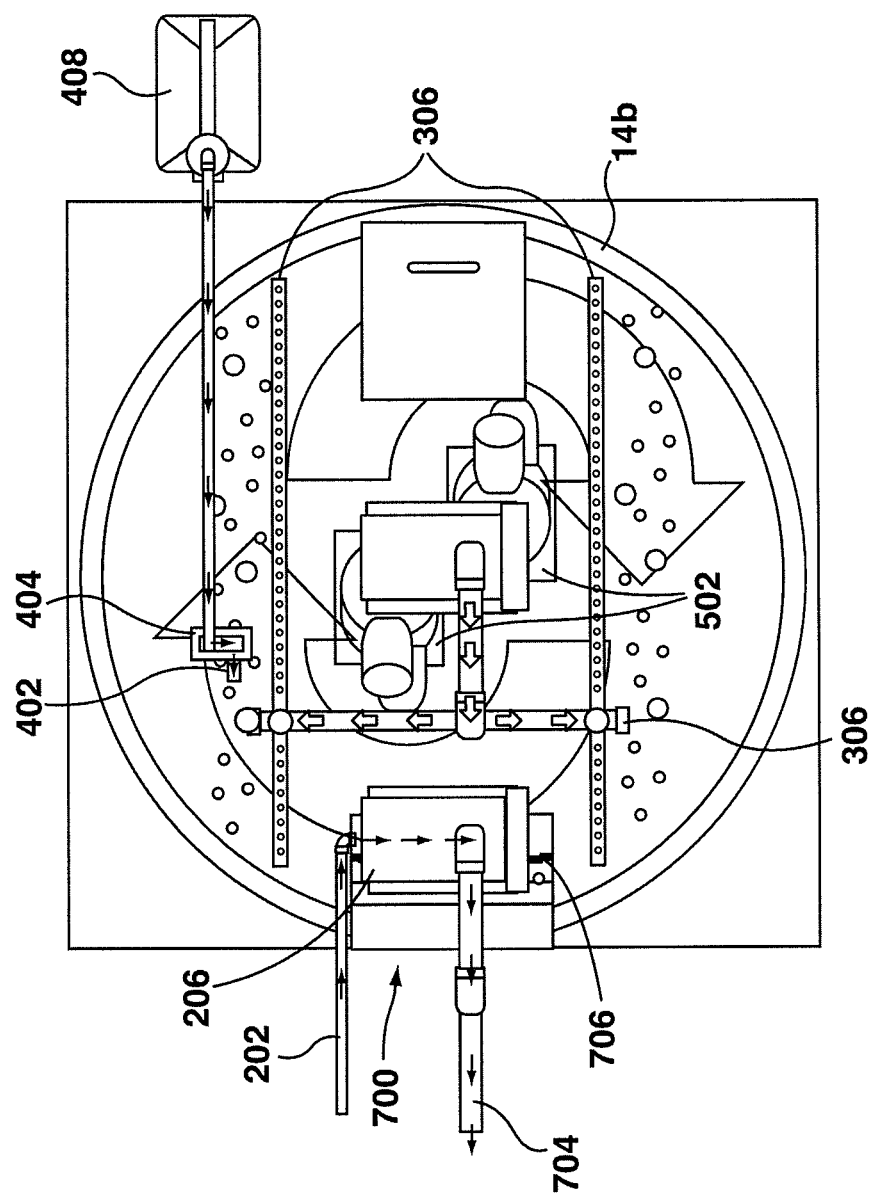
FIG. 2 is a top sectional view of the system of FIG. 1.
Figure 5:
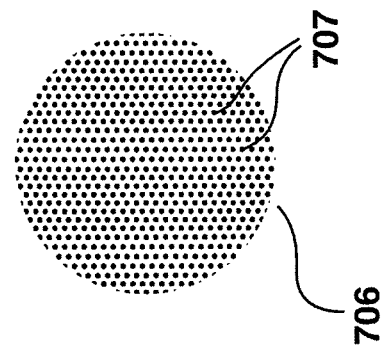
FIG. 5 is an enlarged view of the holes defined in the filter screen for the region shown in FIG. 4.
Figure 4:
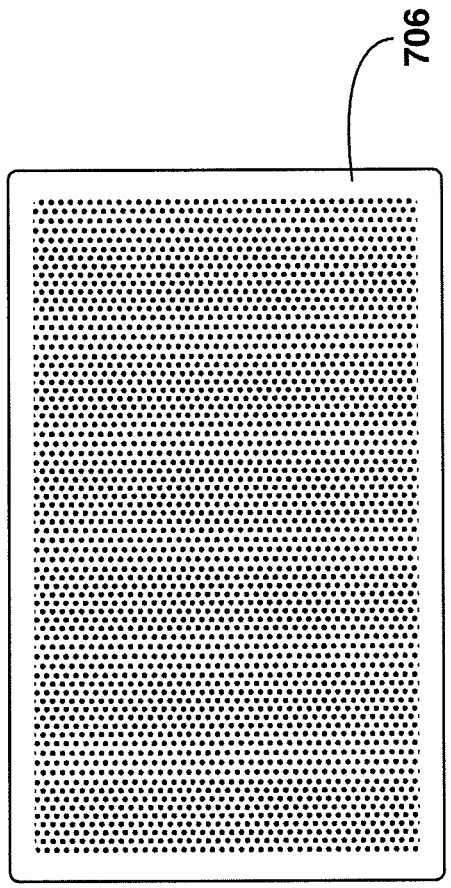
FIG. 4 is a front view of the filter screen for the system of FIG. 1.

A food waste disposal system in accordance with the present invention is shown generally at 10 in FIG. 1. System 10 includes a tank 12 having walls 14, including top wall 14a, sidewall 14b and bottom wall 14c. Walls 14 define an interior chamber 16 for containing food waste 18 that is fully submersed in water 20. The system is intended primarily for use at a supermarket, restaurant, hospital or other commercial or industrial food services facilities allowing food waste 18 to be dealt with onsite.

Food waste 18 is substantially comprised of leftover, expired, spoiled or other unwanted or unsafe food products, cooked or uncooked, typically derived from plant or animal sources including vegetables, fruits, meat, fish, poultry, dairy products, bones, shells, peels, pits, coffee grounds, fats, oils and greases.

Sidewall 14b is preferably cylindrical for encouraging circulation of food waste 18 and water 20 about a vertical circulation axis A. Bottom wall 14c is preferably flat and horizontally disposed as shown in the Figures however other bottom wall configurations may be utilized such as a rounded or partial spherical bottom wall that encourages waste material to collect centrally at the bottom of internal chamber 16.

Tank 12 may be formed of metal (preferably stainless steel), plastic (such as high-density polyethylene) or other materials suitable for the intended use of system 10.

Walls 14 are preferably insulated to help maintain internal temperatures within interior chamber 16. A double wall construction, with insulation disposed between the walls, is preferred both for insulation as well as extra protection against punctures and leaks.

System 10 further includes a food waste supply system 100, a water supply system 200, a gas supply system 300, a nutrient supply system 400, a grinder system 500, a circulation system 600, a filtration and discharge system 700 and a control system 800 all described further below.

Food waste supply system 100 includes an access opening 102 defined in top wall 14a or sidewall 14b of tank 12 for providing access to interior chamber 16. A hopper 104 for receiving food waste 18 to be deposited into interior chamber 16 is disposed over access opening 102. Hopper 104 includes a door 106 that may be slidably or pivotably opened and closed for loading of hopper 104.

Water supply system 200 includes a water inlet 202 that extends between interior chamber 16 and the exterior of tank 12. Water inlet 202 is connected to a water supply 204. Water supply 204 is preferably a municipal water supply but could be rain water, lake or sea water or any other suitable water supply. It is contemplated that grey water may also be used with system 10 but this is currently less preferred due to its lower oxygen content.

A high pressure water pump 206 may be provided for supplying water 20 under sufficient pressure for cleaning filter screen 706 as described further below. Water supply system 200 further includes a water level sensor 208, such as a float or an optical or electrical sensor that senses when the level of water in tank is below a desired threshold. Water sensor 208 communicates with control system 800 to facilitate the addition of water 20 to tank 12.

Gas supply system 300 includes a gas inlet 302 that extends between interior chamber 16 and the exterior of tank 12. Gas inlet 302 is connected to a compressor 304 located outside of tank 12. The other end of gas inlet 302 is connected to one or more diffusers 306 having exit openings 308 that are disposed in the interior chamber 16 proximate to the bottom wall 14c of the tank 12. Gas supply system 300 provides a desired compressed gas, typically air or oxygen, to the interior chamber to aid the decomposition of food waste 18.

Nutrient supply system 400 includes a nutrient supply inlet 402 that extends between interior chamber 16 and the exterior of tank 12. Nutrient supply inlet 402 is connected to a nutrient supply pump 404, such as a peristaltic pump, for pumping a desired amount of a nutrient additive 406 from a nutrient additive container 408 to interior chamber 16. Nutrient additive 406 is dosed automatically at predetermined intervals (eg every 4 hours) by control system 800. The amount of nutrient additive 406 to be dosed is predetermined based on the volume of internal chamber 16 with a view to processing an expected amount of food waste 18 over a 24 hour period.

Nutrient additive 406 comprises one or more nutrients such as Sulphate or TKN (Nitrogen)), minerals (such as Copper, Magnesium, Potassium or Zinc), amino acids (such as Ascorbic, Benzoic or Lipoic) and vitamins (such as B-6/12, C, E, or K) that are preferably derived from natural plant sources and typically absent or lacking in sufficient quantities in food waste 18. The nutrient additive 406 contains nutrients that aid in the decomposition of food waste.

The nutrient additive 406 supplements nutrients that may already be contained within the food waste 18 and/or provides additional desired nutrients that aid in the decomposition of food waste. It is believed that nutrient additive 406 provides at least one of the following advantages to the system 10: (a) promotes cellular division and proliferation of the bacterial populations responsible for decomposition (hydrolytic, acetifying, facultative bacteria); and/or (b) allows bacterial populations responsible for decomposition to out compete sulphide fixing bacteria (responsible for odours) for resources resulting in suppression of this bacterial population and/or (c) facilitates/catalyzes the hydrolytic rate limiting step in the biochemical reaction of the decomposition process in the bacterial populations.

Grinding system 500 and circulation system 600 are preferably provided together using one or more submersible grinder pumps 502 (such as a Goulds™ 220 volt 3 phase pump rated for 135 GPM) secured to the bottom of the interior chamber 16. Grinder pumps 502 include an inlet 504 that is disposed proximate to the bottom of inlet chamber 16 and an outlet 506 that is disposed a further distance from the bottom of inlet chamber 16. Grinder pumps 502 include an internal grinding mechanism (not shown) that is adapted to grind and macerate food waste 18 prior to ejection under pressure through outlet 506.

Grinder pumps 502 are preferably oriented with outlet 506 extending in an upward and outward direction relative to the bottom of interior chamber 16 to circulate the water 20 and food waste 18 within the interior chamber 16 in a vortex about circulation axis A. Outlet 506 may include an extender 510 for extending outlet 506 a desired distance upwardly and outwardly relative to bottom of interior chamber.

As a result, food waste that descends to the bottom of the interior chamber 16 is drawn together with water 20 into the inlet 504, ground into smaller pieces and ejected in an upward and outward direction under pressure through outlet 506 to circulate in tank about circulation axis A. This process repeats itself with the result that the food waste 18 is ground into smaller and smaller particles which helps with decomposition and reduction of BOD and suspended solid levels as well as reduction of fats, oils and greases.

Grinder pumps 502 preferably have the dual function of grinding food waste as well as circulating the contents of tank. In an alternative arrangement, grinding system 500 may be provided using one or more submersible grinders secured to the bottom of interior chamber 16 for the purpose of grinding food waste 18 that falls to the bottom of tank 12. A separate circulation system 600 may be provided, using circulation pumps, rotating paddles or other suitable means for circulating, stirring or agitating tank contents in an upward and outward direction about circulation axis A as described above.

Filtration and discharge system 700 includes a discharge outlet 702 that extends between an upper portion of the interior chamber 16 and the exterior of tank 12. Discharge outlet 702 connects to a discharge conduit 704 for discharging water containing decomposed or partially decomposed food waste 18 from tank 12 to a municipal sewer system or other desired discharge location (such as a discharge chamber where the discharged material may be collected for use for other desired purpose such as fertilization).

Filtration and discharge system 700 further includes a filtration screen 706 that surrounds discharge outlet 702 to deter waste particles that are larger than a predetermined size from passing through screen 706 into discharge outlet 702. Filtration screen includes a plurality of holes 707 arranged in a diamond pattern having staggered centers. The screens are preferably formed of stainless steel (most preferably T-304) and preferably 0.0625 inches thick with 0.0938 diameter holes arranged in rows with a spacing of 0.3125 inches between the centers of the holes in each row with the result that holes in adjacent rows have their holes staggered 0.15625 between the centers of adjacent holes in adjacent rows. A pair of filtration screens with offset holes may be provided as a further deterrent to larger sized particles passing through.

Filtration and discharge system 700 further includes a screen cleaner 708 comprising one or more wide angle spray nozzles 710 extending from a pipe 712 for emitting a spray of pressurized water at a preferred spray angle of 103 degrees and a preferred rate of 1.5 GPM for cleaning food waste that may be caught in screen 706. Screen cleaner 708 is connected to a pump 206 as described above for providing the pressurized spray of water. It will be understood that compressed air provided from compressor pump may be used as well or in place of pressurized water for screen cleaner 708.

Figure 6:
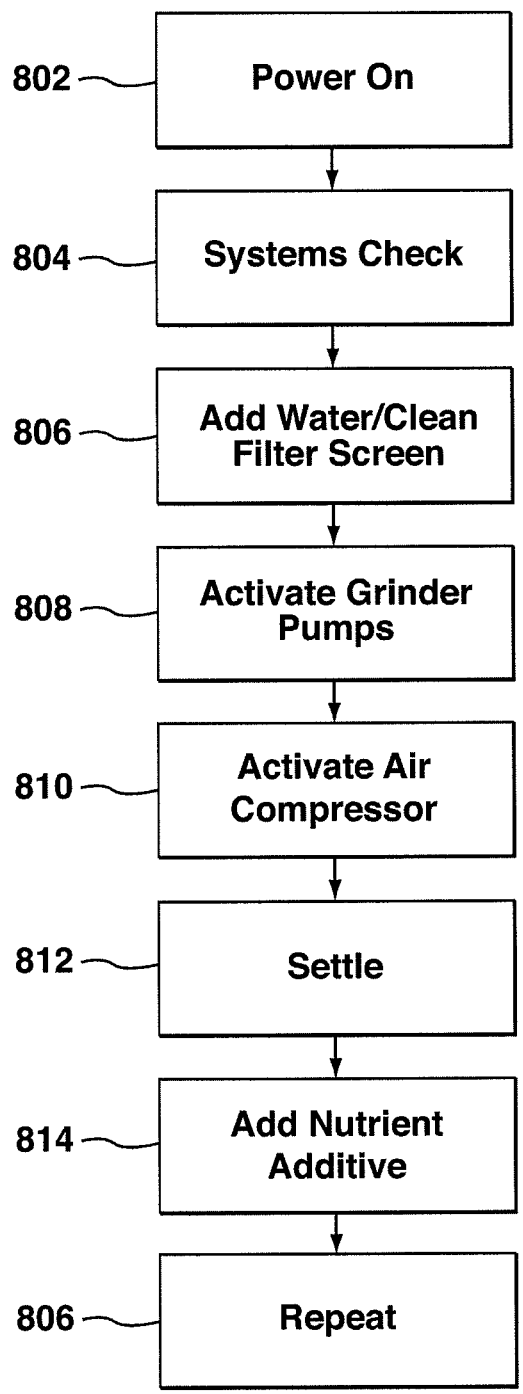
FIG. 6 is a process flow diagram depicting the process flow steps carried out by the control system for the system of FIG. 1.

Control system 800 is provided for controlling operation of the food waste disposal system 10 in accordance with a desired process of operation such as described below and shown in FIG. 6.

Process begins with step 802 where the system is powered on. The system then proceeds to step 804 and performs a diagnostic check to ensure that the hatch 106 is closed and that all pumps and motors are functional. If the diagnostic check identifies any error conditions (hatch open or non functioning pump or motor) the system goes into fault mode and will shut down further operation until the error condition is resolved. The system then proceeds to step 806 and activates high pressure pump 206 to clean filter screen 706 and to add water 20 to tank 12 until a desired water level is sensed by sensor 206. The system then proceeds to step 808 and activates grinder system 500 and circulation system 600 (and preferably grinder pumps 502 which provide both functions). The grinder system 500 and circulation system is operated for 5 minutes. The system then proceeds to step 810 and activates gas supply system to deliver gas (most preferably air or oxygen) to diffuser bars 306 for a period of 30 minutes. The system then proceeds to step 812 and refrains from any operation within the tank for a period of 5 minutes so that the tank contents have an opportunity to settle. The system then determines whether a period of 240 minutes has passed since the cycle began. If the time period has not passed the system then returns to step 806 and repeats the process. When the system determines that a period of 240 minutes has passed since the cycle began, the system proceeds to step 814 and activates nutrient additive pump 404 to add a desired amount of nutrient additive 406 to the tank. The system then returns to step 806 and repeats the process. The system is adapted to operate continuously while additional food waste 18 is added periodically through hatch 106. As the water and smaller sized food waste pass through filter screen 706 and are discharged through conduit 704, additional water 20 and food waste are added to the system in process step 806.

While the above description provides examples of one or more processes or apparatuses, it will be appreciated that other processes or apparatuses may be within the scope of the accompanying claims.

I claim:

1. A food waste management system, comprising:
   a tank having an internal chamber for containing food waste and sufficient water for fully submersing said food waste;
   a water supply system for supplying water to said internal chamber;
   a gas supply system for supplying a desired gas to said internal chamber;
   a filtration and discharge system for filtering and discharging water and food waste from said internal chamber;
   a grinder system for grinding said food waste, said grinder system being disposed in said internal chamber and capable of being fully submersed in said water;
   a circulation system, disposed in said internal chamber, for circulating water and food waste; and
   a control system configured to control operation of said food waste management system by controlling operation of the water supply system, the gas supply system, the filtration and discharge system, the grinder system and the circulation system responsive to a sensed condition and/or a time period.

2. The system of claim 1, further comprising a nutrient additive in said internal chamber, said nutrient additive containing nutrients that aid in the decomposition of said food waste.

3. A system as claimed in claim 2 wherein said nutrient additive contains one or more minerals, amino acids or vitamins that aid in the decomposition of said food waste.

4. A system as claimed in claim 2 further comprising a nutrient supply system including a pump for supplying said nutrient additive to said internal chamber.

5. A system as claimed in claim 1, wherein said filtration and discharge system includes a discharge outlet for discharging water and food waste from an upper portion of said internal chamber to a desired location.

6. A system as claimed in claim 1, wherein said filtration and discharge system includes a filtration screen having a plurality of holes sized to deter passage of food waste of a predetermined size.

7. A system as claimed in claim 6, wherein said holes are arranged in rows with staggered centers.

8. The system of claim 1, wherein said grinding system and said circulation system comprise at least one submersible grinder pump.

9. The system of claim 1, wherein said gas supply system includes at least one diffuser for emitting said gas into a bottom portion of said interior chamber through one or more outlet openings.

* * * * *